(12) United States Patent
Gudaitis (10) Patent No.: US 11,033,121 B1
(45) Date of Patent: Jun. 15, 2021

(54) CONTAINER SYSTEM WITH AUTOMATIC ALIGNMENT FEATURE

(71) Applicant: Evermill, LLC, Los Angeles, CA (US)

(72) Inventor: Mark Gudaitis, Los Angeles, CA (US)

(73) Assignee: Evermill, LLC, Los Angeles, CA (US)

( * ) Notice: Subject to any disclaimer, the term of this patent is extended or adjusted under 35 U.S.C. 154(b) by 45 days.

(21) Appl. No.: 16/407,088

(22) Filed: May 8, 2019

Related U.S. Application Data (60) Provisional application No. 62/668,621, filed on May 8, 2018.

(51) Int. Cl.
| | | |
|---|---|---|
| A47F 7/28 | (2006.01) | |
| A47J 47/16 | (2006.01) | |
| B21D 22/02 | (2006.01) | |
| A47F 7/00 | (2006.01) | |

(52) U.S. Cl.
CPC ............ *A47F 7/285* (2013.01); *A47F 7/0071* (2013.01); *A47J 47/16* (2013.01); *B21D 22/02* (2013.01)

(58) Field of Classification Search
CPC . A47J 47/16; A47J 47/04; A47F 7/285; A47F 7/0071; A47F 7/283; A47B 77/16; A47B 73/00; A47B 7/008; B21D 22/02
See application file for complete search history.

(56) References Cited

U.S. PATENT DOCUMENTS

| | | | | |
|---|---|---|---|---|
| 1,663,822 A | * | 3/1928 | Walker ...................... | B67B 7/18 |
| | | | | 215/376 |
| 1,746,137 A | * | 2/1930 | Winter ..................... | A47J 47/16 |
| | | | | 211/88.01 |
| 2,030,899 A | * | 2/1936 | Scurlock ................ | A47G 23/08 |
| | | | | 211/77 |
| 2,052,801 A | * | 9/1936 | Russakov ................. | A47F 5/02 |
| | | | | 211/77 |
| 2,091,394 A | * | 8/1937 | Park ........................ | A47J 47/14 |
| | | | | 211/77 |
| 2,190,567 A | * | 2/1940 | Jung ........................ | A47F 7/283 |
| | | | | 248/108 |
| 2,281,849 A | * | 5/1942 | Mccoppin ........................ | 211/77 |
| 3,307,709 A | * | 3/1967 | Hulterstrum ............ | A47J 47/16 |
| | | | | 211/85.19 |
| 3,650,381 A | * | 3/1972 | Weindling ................ | A47F 5/08 |
| | | | | 206/742 |
| 3,750,890 A | * | 8/1973 | Smith .................... | A47G 29/08 |
| | | | | 211/75 |
| 4,378,889 A | * | 4/1983 | Lebowitz ................ | A47J 47/16 |
| | | | | 211/74 |
| 4,775,055 A | * | 10/1988 | Morse ...................... | A47F 5/02 |
| | | | | 211/77 |
| 5,024,318 A | * | 6/1991 | Schwarze ............ | A47B 49/008 |
| | | | | 198/465.2 |
| 5,183,165 A | * | 2/1993 | Acona .................... | A47B 73/00 |
| | | | | 211/163 |

(Continued)

*Primary Examiner* — Patrick D Hawn
(74) *Attorney, Agent, or Firm* — Aka Chan LLP (57) ABSTRACT

An improved container system is capable of automatically aligning or orienting each container to face in a particular orientation. This allows the container to automatically face forward when it is stored, thus having, for example, the label face forward. Then a user will be more quickly able to find a particular container holding the contents the user is looking for. In a specific implementation, the container system is a spice rack.

18 Claims, 8 Drawing Sheets

(56) References Cited

U.S. PATENT DOCUMENTS

| | | | | |
|---|---|---|---|---|
| 5,641,080 | A * | 6/1997 | Humphrey | A47B 49/004 211/163 |
| 5,655,673 | A * | 8/1997 | Weterrings | A47B 81/00 211/74 |
| 6,029,828 | A * | 2/2000 | Robbins | A47B 49/004 108/157.1 |
| 6,131,772 | A * | 10/2000 | Robbins | A47B 49/004 220/608 |
| 6,182,839 | B1 * | 2/2001 | Robbins | A47B 49/004 211/115 |
| 6,505,747 | B1 * | 1/2003 | Robertson | A47F 7/283 211/194 |
| D504,284 | S * | 4/2005 | Corona | D7/600.4 |
| 6,899,236 | B2 * | 5/2005 | Yang | A47B 81/00 211/71.01 |
| 7,083,070 | B2 * | 8/2006 | McGuyer | A47G 23/08 211/77 |
| 7,156,226 | B1 * | 1/2007 | Van Sickle | A45C 11/20 206/1.5 |
| 7,232,039 | B2 * | 6/2007 | Doran | B44D 3/04 211/74 |
| 7,237,686 | B2 * | 7/2007 | Bertrand | A47B 73/00 211/126.15 |
| 8,240,512 | B2 * | 8/2012 | Sunatori | B65D 51/242 222/142.3 |
| 8,915,391 | B2 * | 12/2014 | Radow | A47G 19/00 220/23.83 |
| 8,955,699 | B2 * | 2/2015 | Wilder | B25H 3/025 211/77 |
| 2002/0170868 | A1 * | 11/2002 | Morgan | A47G 23/08 211/77 |
| 2003/0000903 | A1 * | 1/2003 | Mondragon | A47F 5/02 211/144 |
| 2007/0163973 | A1 * | 7/2007 | Smokowicz | F16M 11/041 211/70 |
| 2007/0170132 | A1 * | 7/2007 | Bertrand | A47B 77/16 211/70.6 |
| 2012/0201644 | A1 * | 8/2012 | Wilder | A47J 47/16 414/800 |
| 2013/0180939 | A1 * | 7/2013 | Wilder | A47B 49/00 211/78 |
| 2016/0262574 | A1 * | 9/2016 | Fish | A47J 47/16 |
| 2018/0027962 | A1 * | 2/2018 | Benz | A47G 23/0241 |

* cited by examiner

CONTAINER SYSTEM WITH AUTOMATIC ALIGNMENT FEATURE

CROSS-REFERENCE TO RELATED APPLICATIONS

This patent application claims the benefit of U.S. patent application 62/668,621, filed May 8, 2018, which is incorporated by reference along with all other references cited in this application.

BACKGROUND OF THE INVENTION

This invention relates to the field of organization and containers, and more specifically, to a spice rack with jars that with automatically align so the label (or front of the jar) will face forward. The automatic alignment feature makes it easier for the user to see the label of the jar, and then select which of the jars to pull off the rack.

People buy and store things in containers, which include cans, jars, boxes, and others. Each container usually holds a different item, such as different types of soup, spices, drugs or pills, baby food, hardware (e.g., fasteners, nails, screws, or nuts), and many others. People usually store these containers in a cabinet or on a shelf. When they need a particular item, a user identifies which container has the item pull out that container. And after they are finished with that item, they return the container to the cabinet or shelf.

The containers are typically returned to the cabinet quickly and placed randomly. The label or front of the container may or may not be facing forward. If not facing forward, then the next time the user needs that particular item, they may need to touch a number of containers and twist the container so the label faces forward in order to identify its contents. This is a time consuming process.

Therefore, there is a need for an improved container system, which is capable of automatically aligning or orienting each container to face in a particular orientation. Then, for example, a label of the container will automatically face forward, and the user will be more quickly able to find the container holding the contents the user is looking for.

BRIEF SUMMARY OF THE INVENTION

An improved container system is capable of automatically aligning or orienting each container to face in a particular orientation. This allows the container to automatically face forward when it is stored, thus having, for example, the label face forward. Then a user will be more quickly able to find a particular container holding the contents the user is looking for. In a specific implementation, the container system is a spice rack.

In an implementation, a system includes a rack having: a first shelf with a number of first raised alignment shapes, where the first shelf has a width in a first direction and a length in a second direction, which is transverse to the first direction; a second shelf with a number of first raised alignment shapes; a first strap, connected to and connecting the first shelf and the second shelf; and a second strap, connected to and connecting the first shelf and the second shelf, where the first strap and second strap have a height in a third direction, which is transverse to the first and second directions. A first raised alignment shape has a height in the third direction, is symmetric about a first line passing through the first raised alignment shape in the first direction, and is asymmetric about a second line passing through the first raised alignment shape in the second direction.

The system can include one or more containers. Each container includes a second raised alignment shape, where the second raised alignment shape fits over a first raised alignment shape of the rack in only a single orientation. The second raised shape includes a height that extends into the container, is symmetric about a third line passing through the second raised alignment shape, is asymmetric about a fourth line passing through the second raised alignment shape, and the third line is transverse to the fourth line.

In an implementation, a container includes a raised alignment shape. The raised shape includes a height that extends into the container, is symmetric about a first line passing through the raised alignment shape, is asymmetric about a second line passing through the raised alignment shape, and the first line is transverse to the second line. The raised alignment shape can be a teardrop shape.

U.S. patent application Ser. Nos. 29/690,530, 29/690,533, and 29/690,534, filed May 8, 2019, are incorporated by reference.

Other objects, features, and advantages of the present invention will become apparent upon consideration of the following detailed description and the accompanying drawings, in which like reference designations represent like features throughout the figures.

DETAILED DESCRIPTION OF THE INVENTION

FIGS. 1-5 show various views of a rack of a container system. In a specific implementation, the container system is a spice rack, where spices (e.g., salt, pepper, basil, chili, cardamom, cinnamon, cloves, cumin, curry, ginger, mustard, turmeric, nutmeg, thyme, oregano, mint, and others, and combinations of these or others spices) are stored in each container or jar. In other implementations, the container system is for other applications, such as containers for drugs, small parts, liquids, creams, ointments, or cosmetics or personal care items, or other items or any combination of items.

Figure 1:
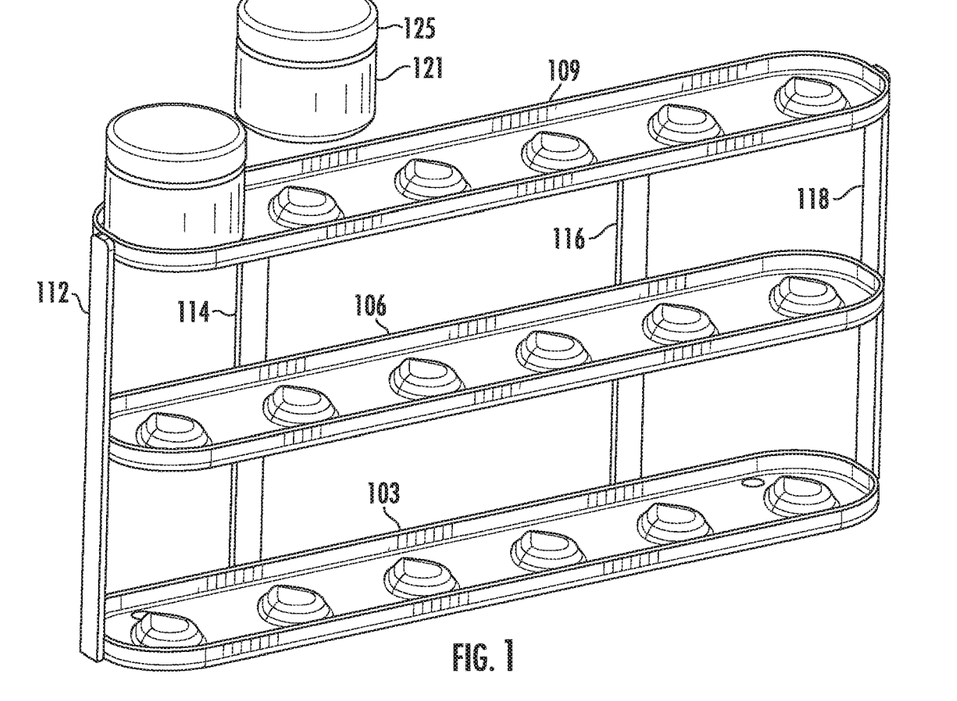
FIGS. 1-5 show various views of a rack of a container system.
Figure 2:
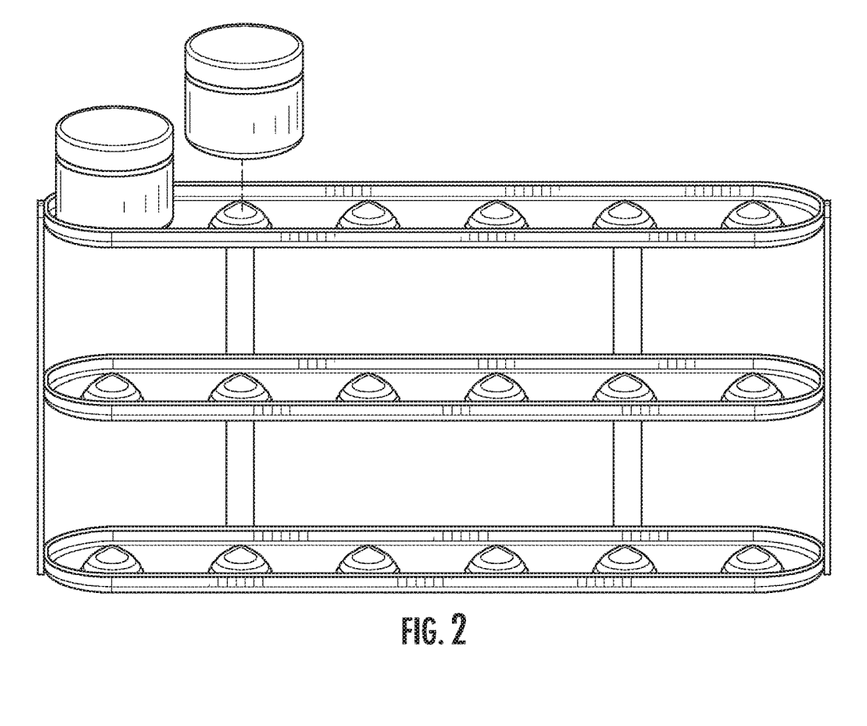
Figure 3:
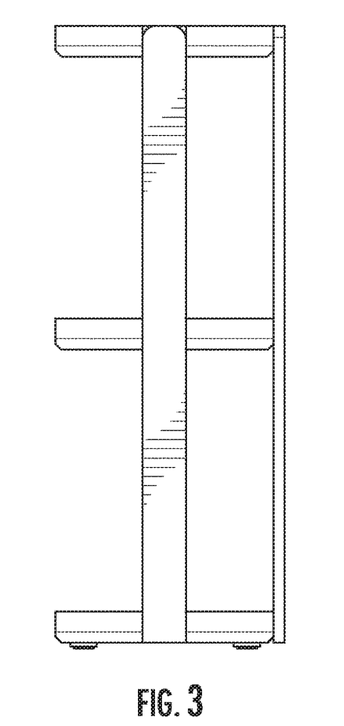

FIG. 1-2 show perspective views of the rack with some sample containers or jars placed of the rack. FIG. 3 shows a side view of the rack. The rack has three shelves. But in other implementations, the rack can have fewer than three shelves (e.g., two shelves or one shelf), or more than three shelves, such as four, five, six, or more shelves. The rack can be made from wood, plastic, metal (e.g., iron, aluminum, or steel), or other materials, or any combination of materials.

In a specific implementation, the rack is made from steel or iron, which is magnetic. The components of the rack include shelves 103, 106, and 198 and straps 112, 114, 116, and 118 between the shelves.

A shelf can be formed using tooling and a process:
1. Tear drops formed by stamping sheet metal.
2. An outer shape blank (with tear drops) is stamped to remove (or cut) it from the sheet metal.
3. Side walls (or lips) are formed by stamping the cut outer shape blank.

The straps are formed from sheet metal by a similar stamping process as described above.

The straps are attached to the shelves by spot welding and hold the three shelves in place in a stacked arrangement. Spot welding is one form of resistance welding, which is a method of welding two or more metal sheets together without using any filler material by applying pressure and heat to the area to be welded. The process is used for joining sheet materials and uses shaped copper alloy electrodes to apply pressure and convey the electrical current through the workpieces. In resistance welding, the parts are locally heated. The material between the electrodes yields and is squeezed together. It then melts, destroying the interface between the parts. The current is switched off and a nugget of molten materials solidifies forming the joint.

The rack, shelves and straps, are colored by powder coating using a copper-colored coating. After powder coating, the surfaces of the rack are spray painted with a top gloss coat. Powder coating is a type of coating that is applied as a free-flowing, dry powder. The powder coating does not require a solvent to keep the binder and filler parts in coating and is then cured under heat to allow it to flow and form a "skin." The powder may be a thermoplastic or a thermoset polymer. A powder coating can be used to create a hard finish that is tougher than conventional paint.

In various implementations, the rack is made from wood, plastic, marble, copper, aluminum, brass, gold, silver, bronze, granite, or any stone, metal, wood, or plastic, or any combination of these. The shelves and straps of the rack can be assembled using other techniques including using epoxy, solder, nuts and bolts, screws, MIG welding, stick or arc welding, TIG welding, plasma arc welding, electron beam or laser welding, gas welding, or other technique used to join metal. A surface treatment or color can be applied to the rack using techniques including plating, electroplating, chemical vapor deposition, anodizing, oxidizing, burnishing, and painting. The color can be any desirable color or finish, including silver, bronze, red, blue, green, yellow, brown, black, neon colors, metallics, nonmetallics, matte, glossy, For a single shelf version, there will not be a need for straps. For a two-shelf version, there will be straps between the two shelves, similar to what is shown and described for three shelves. In an implementation, there are four straps 112, 114, 116, and 118. In another implementation, there will be only two straps 114 and 116, where straps 112 and 118 are omitted. In another implementation, there will be only two straps 112 and 118, where straps 114 and 116 are omitted. In other implementations, any number of straps can be used, one, two, three, four, or more, in any combination. For example, a rack can have straps 112 and 114 only, straps 114, 116, and 118 only, strap 114 only, strap 116 only, strap 114 and 118 only, or other configurations.

In an implementation, a weight of a rack is about 1.772 kilograms. In an implementation, a weight of a rack is about 1.8 kilograms. The weight of the rack can range from about 1.7 kilograms to about 1.9 kilograms, and can vary depending on manufacturing tolerances, materials, thickness or type of coating, size of the rack, and other factors.

Each shelf can hold up to six jars 121 or containers. But in other implementations, each shelf can hold fewer than six jars, such as five, four, three, or fewer jars. Or each shelf can hold more than six jars, such as seven, eight, five, six, or more jars. The jars can be made from glass, plastic, or other materials, or any combination of materials. The jar has a screw-on cap 125 or snap-on cover, so that things (e.g., spices) can be placed into and removed from the jar.

In an implementation, ajar is made from glass and has a screw top. The screw top makes an airtight seal, to help preserve its contents. The jar is brown glass jar that is translucent, where the contents of the jar can be seen from the outside the jar. The brown color of the jar prevents ultraviolet light from reaching the contents of the jar, which could otherwise deteriorate or spoil its contents (e.g., spices). The colored jar can prolong the shelf life of the contents of the container.

In other implementations, the jar can be transparent, translucent, or colored, or a combination of these. The jar can have colors including brown, amber, black, red, blue, green, yellow, an ultraviolet-blocking color, or clear, or any combination of these. In various implementations, a weight of a jar is 0.146, 0.142, and 0.140 kilograms. The weight of the rack can range from about 0.130 kilograms to about 0.150 kilograms, and can vary depending on manufacturing tolerances, materials, thickness of the glass, size, and other factors.

Each jar can have printing, such as printing with a name of a different spice for each jar in a set. For printing on a glass jar, the jar is placed on tool jig which has wheel on it and rolls the jar as a screen print is applied on the glass.

Figure 4:
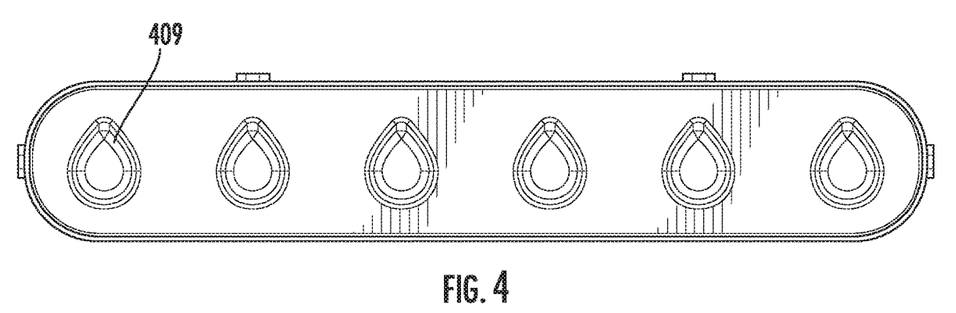
Figure 5:
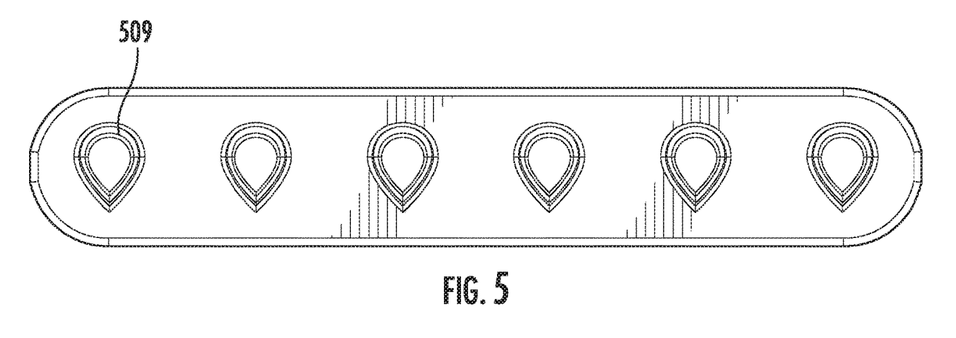
Figure 6:
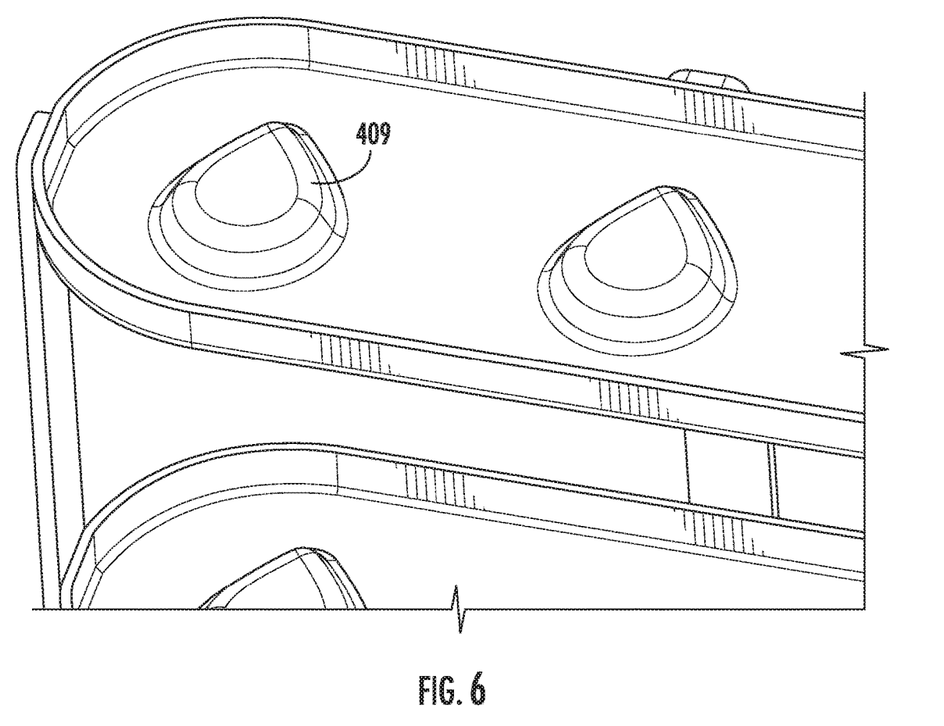
FIG. 6 shows perspective view of a protrusion of a shelf of the rack.

FIG. 4 shows a top view of a shelf of the rack. FIG. 5 shows a bottom view of a shelf of the rack. From the top view, each shelf of the rack has teardrop-shaped protrusions 401. From the bottom view (e.g., FIG. 5), each shelf has a teardrop-shaped indentation 509, which corresponds to protrusion 401. FIG. 6 shows perspective view of a protrusion.

In a specific implementation, each shelf has six protrusions. Each protrusion is for a position for a container or jar. In other implementations, a shelf can have fewer than six protrusions (e.g., five, four, three, or fewer protrusions), or more than six protrusions, such as seven, eight, nine, ten, or more protrusions. With greater numbers of protrusions, each shelf will be able to accommodate more containers or jars.

Figure 7:
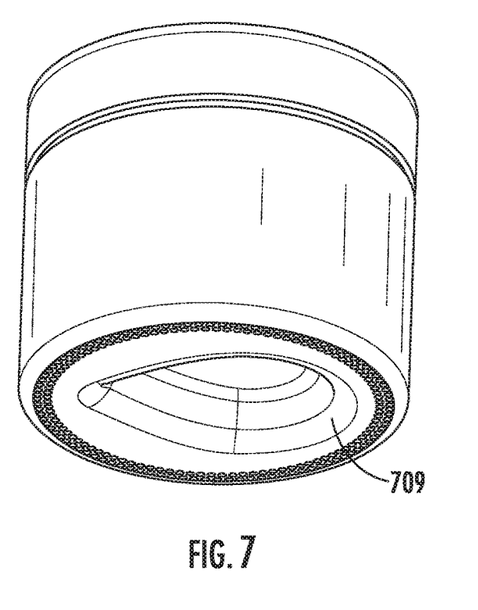
FIGS. 7-8 shows views of a bottom of a container or jar of the container system.
Figure 8:
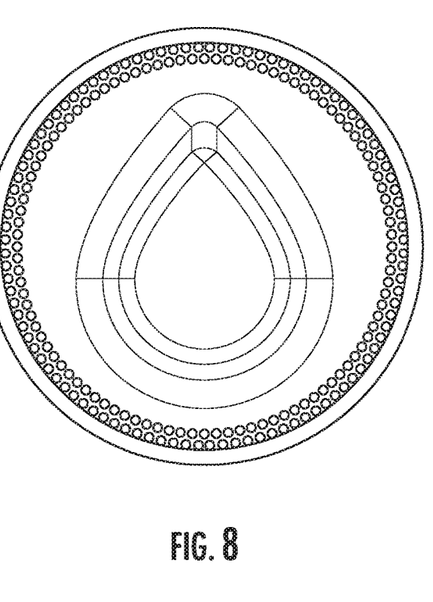

FIGS. 7-8 shows views of a bottom of a container or jar of the container system. The bottom has a teardrop-shaped cavity (or indentation) 709, into which protrusion 401 will fit and mate. Further except for the protrusion, the bottom of the container is relatively flat, which allows the container to be placed stably on a table, such as when removed from the rack.

The shelf protrusion and jar cavity allow locating and orienting of the jar on the shelf. With the teardrop shape, there is only a single orientation that the jar can sit on the shelf, where a label on the jar is facing forward.

Figure 9:
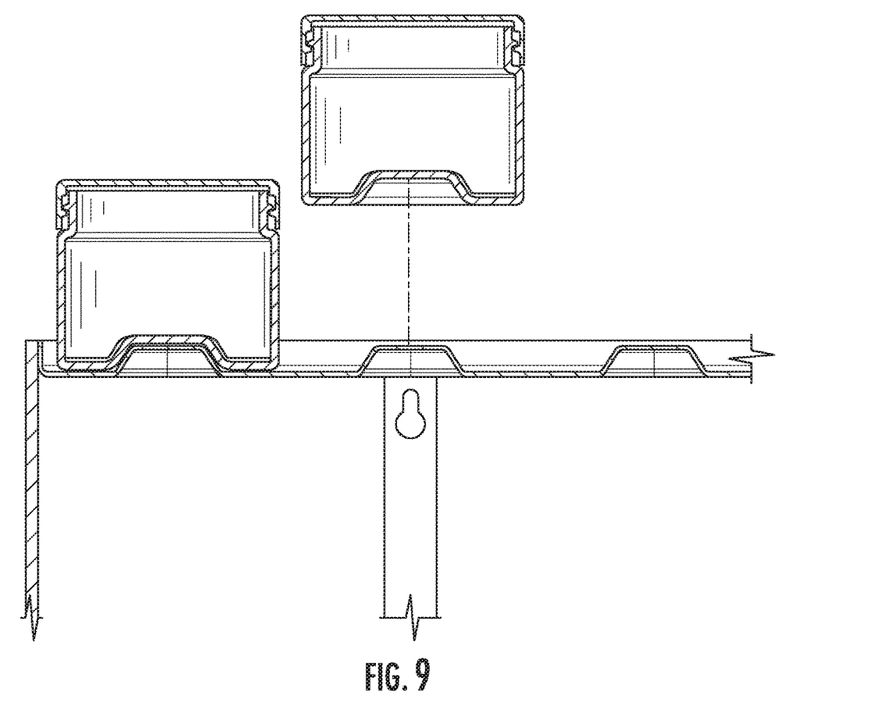
FIGS. 9-11 show cross-sectional views of how the shelf protrusion and cavity of the jar mate together.
Figure 10:
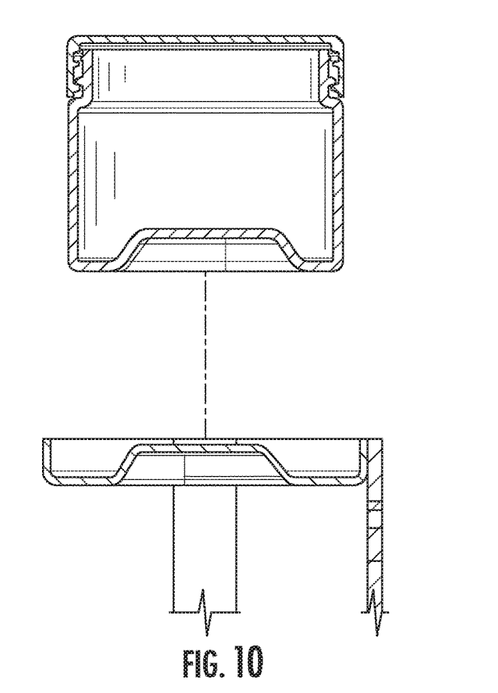
Figure 11:
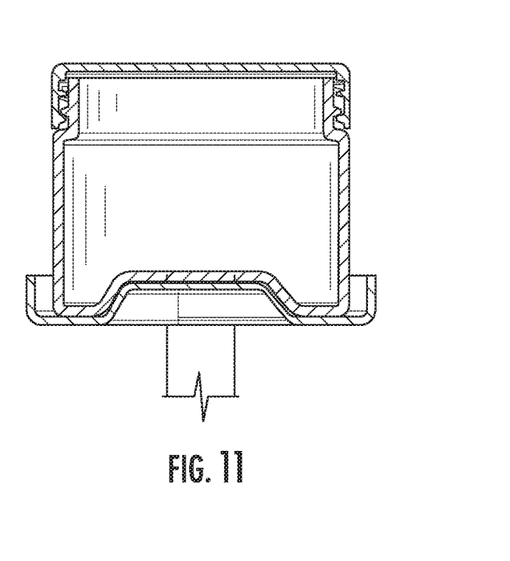

FIGS. 9-11 show cross-sectional views of how the shelf protrusion and cavity of the jar mate together. The shape and size of the protrusion match to ensure a close fit with little play. In a specific implementation, the protrusion and cavity shapes are closely sized, as close as about 0.1 millimeters difference in size; the cavity may be slightly larger to ensure the jar will fit into the protrusion.

Figure 12:
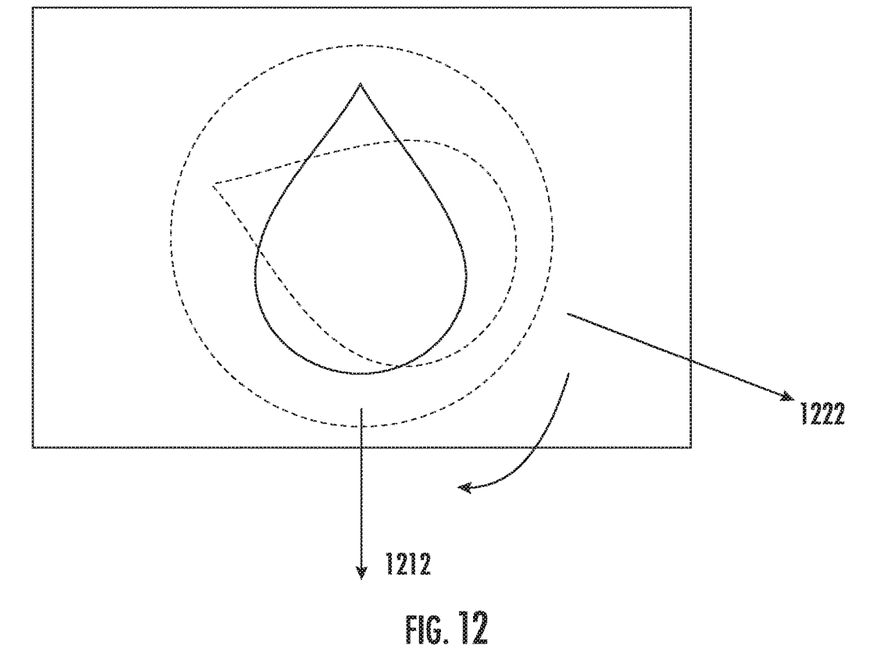
FIGS. 12-13 show operation of an automatic alignment feature of the container system.
Figure 13:
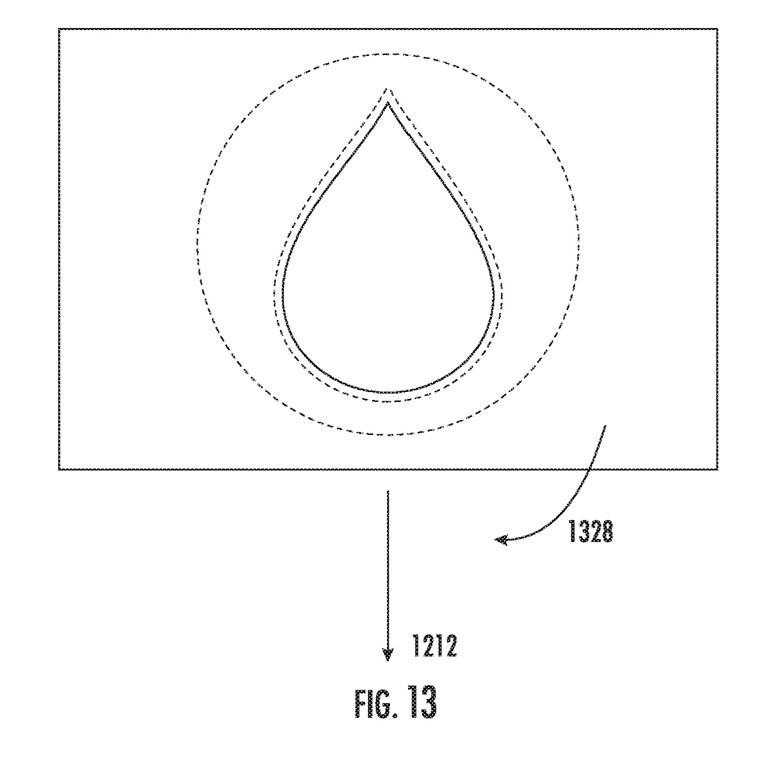

FIGS. 12-13 show operation of an automatic alignment feature of the container system. In FIG. 12, a shelf and protrusion are shown in solid lines, while a jar and its cavity are shown in broken lines. The protrusion is a direction 1212, while the cavity is in a direction 1222. The jar with its cavity is being placed on the protrusion in a misaligned orientation relative to the protrusion.

When the jar is placed the in a misaligned orientation on the protrusion, by gravity (e.g., weight of the jar being placed on shelf and protrusion), the protrusion will cause the cavity and jar to rotate 1328 so that both cavity and protrusion are in direction 1212 automatically. Then a label of the jar will be forward facing automatically. In a specific implementation, the cavity of the jar and the protrusion can be misaligned by up to 45 degrees, and the automatic alignment feature will operate to rotate the jar. In other implementation, the protrusion and cavity can have other sizes and shapes (e.g., other than a teardrop shape). Then the automatic alignment feature can handle greater or fewer degrees than 45 degrees of misalignment.

FIGS. 14A-14E show examples of other shapes that can be used for an automatic alignment feature. The shapes, including the teardrop shape, have symmetry about an axis in direction 1212, and are symmetric about an axis transverse to direction 1212.

Figure 14A:
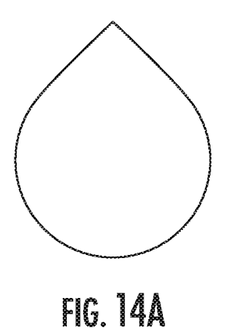
FIGS. 14A-14E show examples of other shapes that can be used for an automatic alignment feature.
Figure 14B:
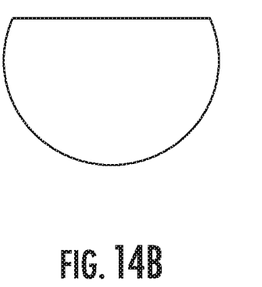
Figure 14C:
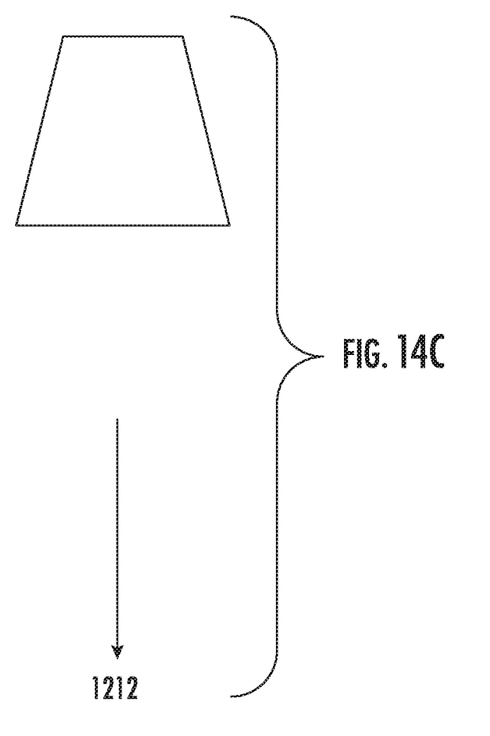
Figure 14D:
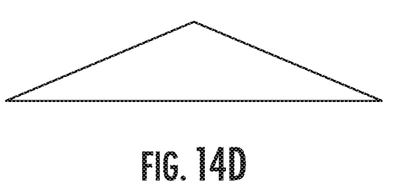
Figure 14E:
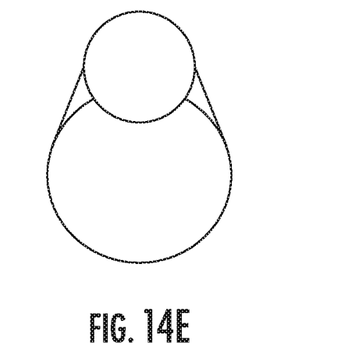

FIG. 14A is another teardrop shape. FIG. 14B is a shape with a circle with a straight line portion shape. FIG. 14C is a trapezoid shape. FIG. 14E is a triangle shape. FIG. 14E is a shape with two circles that have been merged together with straight lines (e.g., tangent lines) joining them together. The 1212 direction is a direction from a top of the page to the bottom of the page.

This patent describes some examples of implementations with specific dimensions, measurements, and values. These are not intended to be exhaustive or to limit the invention to the precise form described. The dimensions or measurements of length and width are in millimeters, and angles in degrees. The values are approximate values. These values can vary due to, for example, measurement or manufacturing variations or tolerances or other factors. For example, depending on the tightness of the manufacturing tolerances, the values can vary plus or minus 5 percent, plus or minus 10 percent, plus or minus 15 percent, or plus or minus 20 percent.

Further, the measurements are for a specific implementation of the rack and containers, and other implementations can have different values, such as certain dimensions made larger for a larger-sized system, or smaller for a smaller-sized system. The apparatus may be made proportionally larger or smaller by adjusting relative measurements proportionally (e.g., maintaining the same or about the same ratio between different measurements). In various implementations, the values can be the same as the value given, about the same of the value given, at least or greater than the value given, or can be at most or less than the value given, or any combination of these.

In a specific implementation, the teardrop-shape protrusion of a shelf has a length of about 46 millimeters in direction 1212 and a width of about 37 millimeters in a direction transverse or perpendicular to direction 1212. A height of the protrusion is about 8 millimeters.

The teardrop-shape cavity of a jar has a length of about 49 millimeters in direction 1212 and a width of about 41 millimeters in a direction transverse to direction 1212. A depth of the cavity is about 8 millimeters.

A shelf has a length of about 455 millimeters in a direction transverse to direction 1212. A shelf has a width of about 81 millimeters. This shelf can accommodate six protrusions 409. A jar has an overall height of about 56 millimeters and a diameter of about 68.58 millimeters.

In a specific implementation, a length of a rack shelf is about 455 millimeters. A width of a rack shelf is about 79 millimeters. A height of a rack, without jars, is about 193 millimeters. A strap thickness is about 10 millimeters, which makes a rack thickness, from back to front, about 89 millimeters (i.e., 79 millimeters plus 10 millimeters). A distance between shelves is about 90 millimeters.

A height of a retaining edging of a shelf is about 11 millimeters. A height of a teardrop protrusion of a shelf is about 8 millimeters. A length for a top of a teardrop, from front to back, is about 25 millimeters. A length for a bottom of a teardrop, from front to back, is about 46 millimeters. A distance from one teardrop to an adjacent teardrop (e.g., axis line to axis line) is about 75 millimeters.

A height of a jar and cap is about 59 millimeters. A width or diameter of a jar is about 69 millimeters. A height of the rack with jar (e.g., on a top shelf of the rack) is about 244 millimeters. When two jars are placed on adjacent teardrops, there is distance or gap of about 10 millimeters between the jars.

For back of the rack, each strap can have slots, such as keyhole slots, cut into the straps. Each strap can have one slot or two slots. These slots can be used to hang the rack on a wall. For examples, screws with screw heads for attached to a wall where the rack will be attached. A screw head will fit into a larger portion of the keyhole slot. Then, by gravity, the screw head will slide upward into a narrow portion of the keyhole slot. The rack will be held in place on the wall by the screws. Containers or jars can be placed on the shelves.

Figure 15:
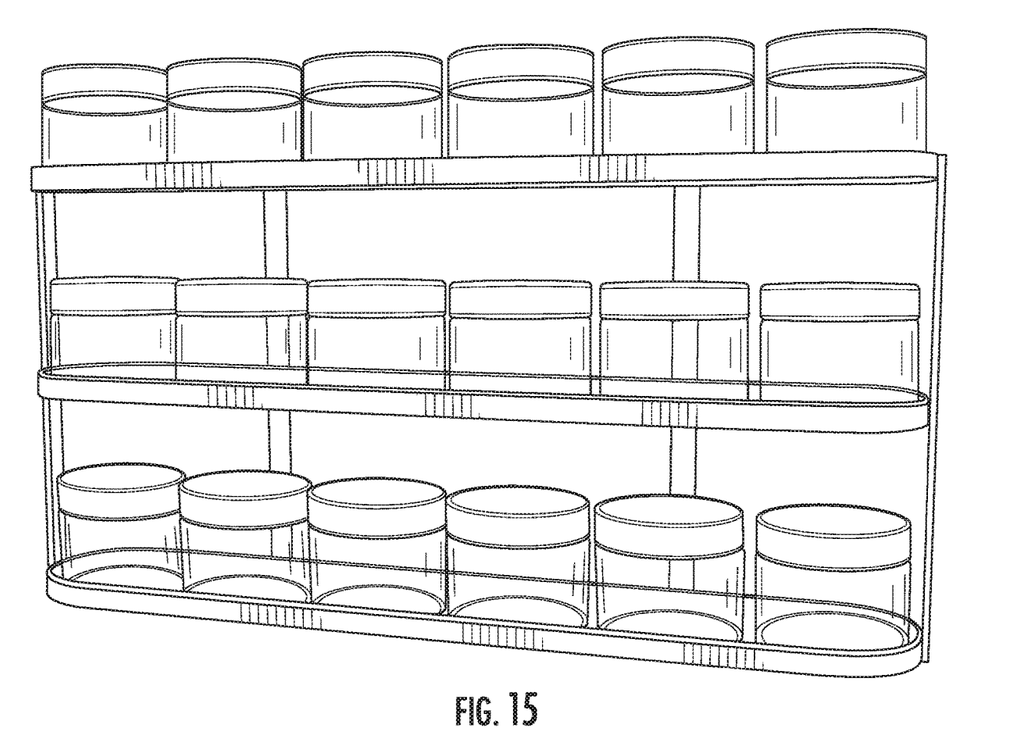
FIGS. 15-17 show renderings for a specific implementation of a spice rack.
Figure 16:
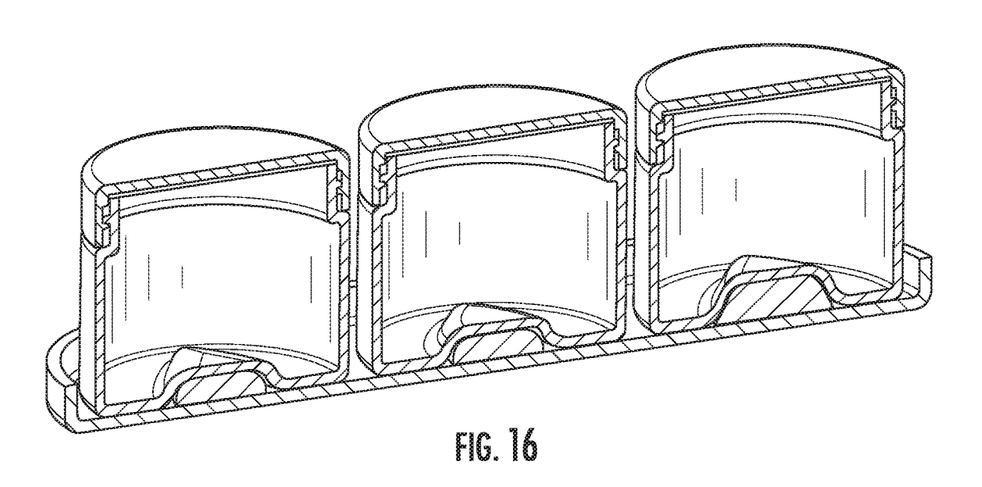
Figure 17:
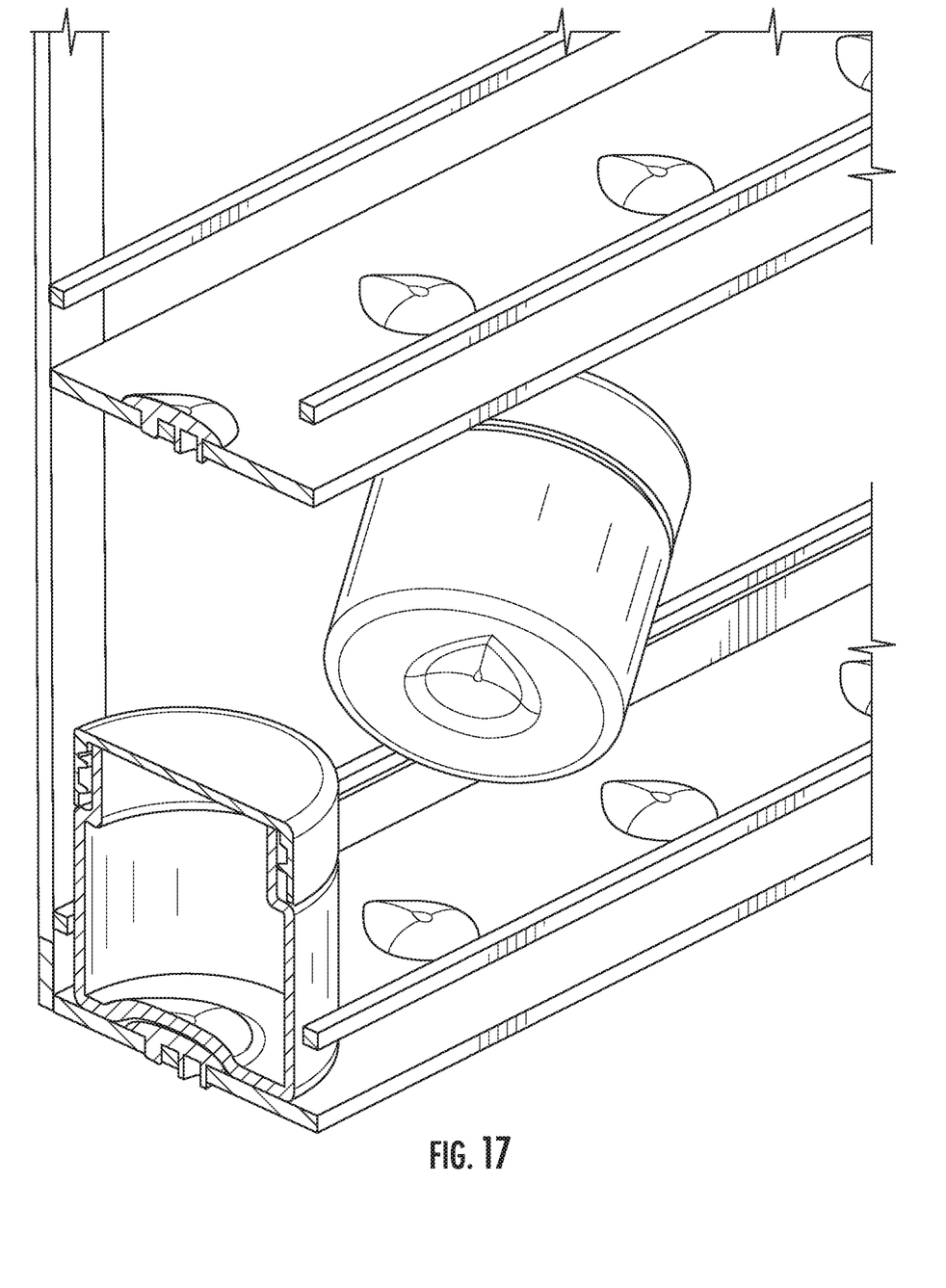

FIGS. 15-17 show renderings for a specific implementation of a spice rack. FIG. 15 shows a perspective front view. FIG. 16 shows a cross-sectional view, where the cavities of the jars connecting with or mate with protrusions of the shelf (where a cut of the cross section is transverse to direction 1212). FIG. 17 shows another cross-sectional view of a jar mating with a protrusion (where a cut of the cross section is along direction 1212).

In a box set of a spice rack, a kit will include a rack, 18 jars, one set of wall hanging screws (e.g., 4 screws and 4 wall anchors), and 18 packets of spices. A customer will tear open the spice packets and fill their own jars upon receiving the kit. In an implementation, in a box set of a items (e.g., spices or other things), a kit will include a rack with X multiple shelves, each shelf has alignment shapes to hold Y jars, up to X*Y jars (i.e., X multiplied by Y), one set of wall hanging screws and anchors, and X*Y packets of items.

In an implementation, a system includes a rack and container. A rack has multiple shelves. A first shelf has a number (e.g., six) of first raised alignment shapes. The first shelf has a width in a first direction and a length in a second direction, which is transverse to the first direction. Similarly, a second shelf has a number of first raised alignment shapes. First and second straps connect the first shelf and the second shelf. The straps have a height in a third direction, which is transverse to the first and second directions.

A first raised alignment shape has a height in the third direction. The first shape is symmetric about a first line passing through the first shape in the first direction. And the first shape is asymmetric about a second line passing through the first raised alignment shape in the second direction.

A container of the system has a second raised alignment shape. The second raised alignment shape fits over a first raised alignment shape of the rack in only a single orientation. The second raised shape has a height that extends into the container. Similarly to the first shape, the second shape symmetric about a third line passing through the second raised alignment shape. The second shape is asymmetric about a fourth line passing through the second raised alignment shape, where the third line is transverse to the fourth line.

The container can be made from a brown glass, which prevents or reduces an amount of ultraviolet light from reaching an interior of the container. The container also has a screw-on top or snap-on top that provides an airtight seal.

A container can have a label created by screen printing on a front side of the container. The front side is a position on the container where label is visible when the container is placed on a shelf and its second raised alignment shape is in alignment with a first raised alignment shape of the shelf.

The third first raised alignment shape has an edging that is sloped. The edging extends in the third direction from a bottom of the first raised alignment shape to a top of the first raised alignment shape. The slope of the edging is less than 90 degrees (and greater than 0), such as 30 degrees or 45 degrees to about 60 degrees. The first raised alignment shape also has rounded corners, which facilitate the automatic alignment feature. The first raised alignment shape of a rack can be a teardrop shape. The second raised alignment shape of a container can be a teardrop shape.

When the container is placed on a first raised alignment shape of a shelf of the rack such that its second raised shape is in a misaligned with the first raised alignment shape, the container will, under the influence of gravity, automatically rotate so that the second raised shape will become aligned with the first raised alignment shape.

The first strap can be spot welded to the first and second shelves. The second strap can be spot welded to the first and second shelves. The first and second shelves and first and second straps are colored by way of a powder coating. The first strap can include at least one keyhole slot, and the second strap can include at least one keyhole slot. These keyhole slot can facilitate hanging of the rack on a wall or other vertical surface.

A kit of rack and container can include a number of containers, one for each of the first raised alignment shapes of the rack, a number of packages or envelopes of spices, one for each container; wall mounting screws and anchors; and a packaging (e.g., cardboard box) which holds the rack, containers, packages of spices and wall mounting screws and anchors.

In an implementation, a method includes:

1. Stamping first raised alignment shapes in a first row in sheet metal.

2. Stamping first raised alignment shapes in a second row in sheet metal.

3. Stamping to remove a first blank including the first row of first raised alignment shapes from the sheet metal.

4. Stamping to remove a second blank including the second row of first raised alignment shapes from the sheet metal.

5. Stamping the first blank to form sidewalls (or a lip) for the first blank to obtain a first shelf.

6. Stamping the second blank to form sidewalls (or a lip) for the second blank to obtain a second shelf.

7. Forming a first strap.

8. Forming a second strap.

9. Spot welding the first strap to the first shelf and the second shelf, where the second shelf is positioned above the second shelf.

10. Spot welding the second strap to the first shelf and the second shelf, where the second shelf is positioned above the second shelf.

The first shelf has a width in a first direction and a length in a second direction, which is transverse to the first direction. The first strap and second strap have a height in a third direction, which is transverse to the first and second directions. A first raised alignment shape includes a height in the third direction, is symmetric about a first line passing through the first raised alignment shape in the first direction, and is asymmetric about a second line passing through the first raised alignment shape in the second direction.

The method can include:

11. Forming a container comprising a second raised alignment shape, where the second raised alignment shape fits over a first raised alignment shape of the rack in only a single orientation. The second raised shape includes a height that extends into the container, is symmetric about a third line passing through the second raised alignment shape, is asymmetric about a fourth line passing through the second raised alignment shape, and the third line is transverse to the fourth line.

When the container is placed on a first raised alignment shape of a shelf of the rack such that its second raised shape is in a misaligned with the first raised alignment shape, the container will, under the influence of gravity, automatically rotate so that the second raised shape will become aligned with the first raised alignment shape.

In an implementation, an apparatus includes a container having a first raised alignment shape. The first raised shape has a height that extends into the container, is symmetric about a first line passing through the first raised alignment shape, is asymmetric about a second line passing through the first raised alignment shape, and the first line is transverse to the second line. The first raised alignment shape can be a teardrop shape. The container can be made of ultraviolet-light blocking glass. The container can have a screw-on or snap-on top that provides an airtight seal.

The first raised alignment shape has a first end on the first line that is pointed and a second end that is rounded, also on the first line. The first raised alignment shape has a first end on the first line that has a first radius of curvature and a second end that has a second radius of curvature, also on the first line, and the second radius of curvature is greater than the first radius of curvature.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A system comprising:

a rack comprising a first shelf comprising a plurality of first raised alignment shapes having a teardrop shape, wherein the first shelf comprises a width in a first direction and a length in a second direction, which is transverse to the first direction;

a second shelf comprising a plurality of first raised alignment shapes;

a first strap, coupled to the first shelf and the second shelf; and a second strap, coupled to the first shelf and the second shelf, wherein the first strap and second strap have a height in a third direction, which is transverse to the first and second directions, each of the first raised alignment shapes of the first shelf and the second shelf comprises a height in the third direction, is symmetric about a first line passing through the first raised alignment shape in the first direction, and is asymmetric about a second line passing through the first raised alignment shape in the second direction, and the first raised alignment shape comprises an edging, the edging extending in the third direction from a bottom of the first raised alignment shape to a top of the first raised alignment shape, and from the bottom of the first raised alignment shape to the top the first raised alignment shape, a slope of the edging is entirely less than 90 degrees.

2. The system of claim 1 comprising:
a container, comprising a second raised alignment shape, wherein the second raised alignment shape fits over a first raised alignment shape of the rack in only a single orientation, and the second raised alignment shape comprises a height that extends into the container, is symmetric about a third line passing through the second raised alignment shape, is asymmetric about a fourth line passing through the second raised alignment shape, and the third line is transverse to the fourth line.

3. The system of claim 2 wherein the container comprises brown glass and a screw top.

4. The system of claim 2 wherein the container comprises a label formed by screen printing on a front side of the container, wherein the front side is a positioning on the container where the label is visible when the container is placed on a shelf where its second raised alignment shape is in alignment with a first raised alignment shape of the shelf.

5. The system of claim 2 wherein the second raised alignment shape is a teardrop shape.

6. The system of claim 1 wherein the first strap is spot welded to the first and second shelves, the second strap is spot welded to the first and second shelves, and the first and second shelves and first and second straps are colored by way of powder coating.

7. The system of claim 1 wherein the first strap comprises at least one keyhole slot and the second strap comprises at least one keyhole slot.

8. The system of claim 2 wherein when the container is placed on a first raised alignment shape of a shelf of the rack such that its second raised shape is misaligned with the first raised alignment shape, the container will, under the influence of gravity, automatically rotate so that the second raised shape will become aligned with the first raised alignment shape.

9. A kit comprising the system of claim 2, and further comprising:
a plurality of containers, one for each of the first raised alignment shapes;
a plurality of packages of spices, one for each container;
a plurality of wall mounting screws and anchors; and
a packaging which holds the rack, containers, packages of spices and wall mounting screws and anchors.

10. The system of claim 1 wherein from the bottom of the first raised alignment shape to the top the first raised alignment shape, no portion of the edging has a slope of 90 degrees.

11. The system of claim 1 wherein the second shelf of the rack is at a height in the third direction that is above a height of the first shelf.

12. A system comprising:
a rack comprising
a first shelf comprising a plurality of first raised alignment shapes having a teardrop shape, wherein the first shelf comprises a width in a first direction and a length in a second direction, which is transverse to the first direction;
a second shelf comprising a plurality of first raised alignment shapes;
a first strap, coupled to the first shelf and the second shelf;
a second strap, coupled to the first shelf and the second shelf, wherein the first strap and second strap have a height in a third direction, which is transverse to the first and second directions, and each of the first raised alignment shapes of the first shelf and second shelf comprises a height in the third direction; and a container, comprising a second raised alignment shape, wherein the second raised alignment shape fits over a first raised alignment shape of the rack in only a single orientation, and the second raised shape comprises a height that extends into the container, wherein when the container is placed on a first raised alignment shape of a shelf of the rack such that its second raised shape is misaligned with the first raised alignment shape, the container will, under the influence of gravity, automatically rotate so that the second raised shape will become aligned with the first raised alignment shape.

13. The system of claim 12 wherein the first raised alignment shape comprises an edging, the edging extending in the third direction from a bottom of the first raised alignment shape to a top of the first raised alignment shape, and the edging is sloped less than 90 degrees and comprises rounded corners.

14. The system of claim 12 wherein the second shelf of the rack is at a height in the third direction that is above a height of the first shelf.

15. The system of claim 12 wherein the second raised alignment shape is a teardrop shape.

16. A system comprising:
a rack comprising
a first shelf comprising a plurality of first raised alignment shapes having a teardrop shape, wherein the first shelf comprises a width in a first direction and a length in a second direction, which is transverse to the first direction;
a second shelf comprising a plurality of first raised alignment shapes;
a first strap, coupled to the first shelf and the second shelf; and
a second strap, coupled to the first shelf and the second shelf, wherein the first strap and second strap extend from first ends to second ends in a third direction, which is transverse to the first and second directions, the first shelf is coupled to first positions of the first and second straps relative to the first ends, the second shelf is coupled to second positions of the first and second straps relative to the first ends, the second positions are closer to the second ends than the first positions, and at the second positions of the first and second straps, the second shelf is elevated at a height in the third direction that is above the first shelf, and each of the first raised alignment shapes of the first shelf and second shelf comprises a height in the third direction, and an edging extends in the third direction from a bottom of the first raised alignment shape to a top of the first raised alignment shape, and from the bottom of the first raised alignment shape to the top the first raised alignment shape, no portion of the edging has a slope of 90 degrees.

17. The system of claim 16 comprising:

a container, comprising a second raised alignment shape, wherein the second raised alignment shape fits over a first raised alignment shape of the rack in only a single orientation, and the second raised shape comprises a height that extends into the container.

18. The system of claim 17 wherein when the container is placed on a first raised alignment shape of a shelf of the rack such that its second raised shape is misaligned with the first raised alignment shape, the container will, under the influence of gravity, automatically rotate so that the second raised shape will become aligned with the first raised alignment shape.

\* \* \* \* \*